United States Patent
Arai et al.

(10) Patent No.: US 8,305,686 B2
(45) Date of Patent: Nov. 6, 2012

(54) METHOD FOR PRODUCING OPTICAL ELEMENT AND THE OPTICAL ELEMENT

(75) Inventors: Kazuhiro Arai, Yokohama (JP); Junji Terada, Tokyo (JP); Masahide Iwakata, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 649 days.

(21) Appl. No.: 12/510,462

(22) Filed: Jul. 28, 2009

(65) Prior Publication Data

US 2010/0020397 A1    Jan. 28, 2010

(30) Foreign Application Priority Data

Jul. 28, 2008  (JP) ................................ 2008-193737
Jun. 30, 2009  (JP) ................................ 2009-155668

(51) Int. Cl.
    *G02B 5/30* (2006.01)
(52) U.S. Cl. .................... 359/485.05; 264/1.21
(58) Field of Classification Search ............ 359/485.05; 264/1.21, 1.31; 438/539; 385/37
    See application file for complete search history.

(56) References Cited

U.S. PATENT DOCUMENTS

| | | | | |
|---|---|---|---|---|
| 5,236,118 | A * | 8/1993 | Bower et al. | 228/193 |
| 5,393,370 | A * | 2/1995 | Ohta et al. | 438/8 |
| 6,719,868 | B1 * | 4/2004 | Schueller et al. | 156/272.6 |
| 6,785,050 | B2 * | 8/2004 | Lines et al. | 359/485.03 |
| 7,826,113 | B2 * | 11/2010 | Noda | 359/13 |
| 7,894,148 | B2 * | 2/2011 | Okami | 359/888 |
| 2001/0024554 | A1 * | 9/2001 | Lochkovic et al. | 385/114 |
| 2002/0072200 | A1 * | 6/2002 | Czagas et al. | 438/455 |
| 2006/0171033 | A1 * | 8/2006 | Schreder et al. | 359/566 |
| 2007/0201135 | A1 | 8/2007 | Sakamoto | |
| 2007/0244364 | A1 * | 10/2007 | Luanava et al. | 600/160 |
| 2010/0060984 | A1 * | 3/2010 | Davidovits et al. | 359/491 |
| 2011/0277930 | A1 * | 11/2011 | Schueller et al. | 156/272.6 |

FOREIGN PATENT DOCUMENTS

JP    2001-074955 A    3/2001

OTHER PUBLICATIONS

M. K. Chaudhury and G. M. Whitesides, "Direct Measurement of Interfacial Interactions between Semispherical Lenses and Flat Sheets of Poly(dimethylsiloxane) and their Chemical Derivatives", Langmuir 1991, 7, 1013-1025.*

* cited by examiner

*Primary Examiner* — Frank Font
(74) *Attorney, Agent, or Firm* — Canon USA, Inc., IP Division

(57) ABSTRACT

A method for producing an optical element having a three-dimensional structural part that can resolve problems associated with deterioration of optical characteristics that is caused by variations in the element shape in the conventional process and poor endurance caused by insufficient joining strength and the optical element produced by the method are provided. A method for producing an optical element configured by joining at least a first optical member and a second optical member formed from an oxide material includes the processes of forming a refractive index periodic structural part with a period equal to or less than a visible light wavelength on at least one of the first optical member and the second optical member, forming a joining layer composed of an oxygen-deficient oxide on the first optical member and the second optical member, tightly joining the first optical member and the second optical member by the joining layer, and oxidizing the joining layer after the tight joining.

5 Claims, 8 Drawing Sheets

METHOD FOR PRODUCING OPTICAL ELEMENT AND THE OPTICAL ELEMENT

BACKGROUND OF THE INVENTION

1. Field of the Invention

The present invention relates to a method for producing an optical element having a three-dimensional structural part that has a refractory index periodic structure equal to or less than a wavelength of visible light and also relates to the optical element obtained produced by the method.

For example, the invention relates to a method for producing an optical element having a three-dimensional structural part, such as a polarizing beam splitter, a phase plate, and a band-pass filter that has a structure with an in-plane period shorter than a wavelength of visible light on the surface, and to the optical element.

2. Description of the Related Art

Optical elements including a three-dimensional periodic structural part having a refractive index periodic structure equal to or less than a wavelength of visible light have been actively developed.

For example, USP No. 2007/0201135 suggests a polarizing element composed of a structure in which three layers of line-and-space structures overlap with a relative rotation of the line direction through 90°. In this case, a method using a titanium coupling agent as an adhesive is described as a method for bonding the structural part and the substrate. With this method, the titanium coupling agent is diluted by a factor of 60 with isopropyl alcohol, and the diluted agent is coated on the substrate by a spin coating method and pre-cured for 2 min at a temperature of 180° C., thereby forming an adhesive agent layer. The structural part and the substrate are then tightly joined by the adhesive agent layer, and bonding is performed by allowing the configuration to stay for 5 min at a temperature of 200° C. on a hot plate, while applying a load of 2 kg.

Japanese Patent Laid-Open No. 2001-74955 describes a method for joining structural parts by stacking substrates each having a structural part so that the structural parts come into contact and then heating in the $H_2$ atmosphere at a temperature of 650° C. to fuse the structural parts. Where such method is used, covalent bonds or metal bonds can be realized by diffusion of hydrogen, and effective joining can be performed with metals or semiconductors.

However, the following problems are encountered when a bonding-joining method based on the above-described conventional examples is applied to a method for producing an optical element including a three-dimensional structural part.

Thus, in a case where the conventional procedure described in USP No. 2007/0201135 is applied to a method for producing a optical element that has a three-dimensional structural part with a period equal to or less than a wavelength of visible light, the method including a process of joining oxide materials, the adhesive layer penetrates into concave portions of the structural part under the effect of capillary forces.

The resultant problem is that the desired optical characteristics cannot be obtained.

Furthermore, in a case where the conventional procedure described in Japanese Patent Laid-Open No. 2001-74955 is applied to a method for producing a optical element that has a three-dimensional structural part with a period equal to or less than a wavelength of visible light, the method including a process of joining oxide materials, oxides become the object of joining.

The resultant problem is that covalent bonds or metal bonds produced by diffusion of hydrogen are difficult to realize and a sufficient joining strength cannot be obtained.

With the foregoing in view, it is an object of the invention to provide an optical element having a three-dimensional structural part that can resolve the problems associated with deterioration of optical characteristics that is caused by variations in the element shape in the conventional process and poor endurance caused by insufficient joining strength, and also to provide a method for producing the optical element.

SUMMARY OF THE INVENTION

In order to resolve the above-described problems, the invention provides a method for producing an optical element configured by joining at least a first optical member and a second optical member formed from an oxide material, comprising: forming a refractive index periodic structural part with a period equal to or less than a visible light wavelength on at least one of the first optical member and the second optical member; forming a joining layer including an oxygen-deficient oxide on the first optical member and the second optical member; tightly joining the first optical member and the second optical member by the joining layer; and oxidizing the joining layer after the tight joining.

Furthermore, the optical element in accordance with the invention is configured by joining at least a first optical member and a second optical member formed from an oxide material and has a refractive index periodic structural part with a period equal to or less than a visible light wavelength, wherein the refractive index periodic structural part with a period equal to or less than a visible light wavelength is formed on at least one of the first optical member and the second optical member, the first optical member and the second optical member have a joining layer including an oxygen-deficient oxide, and the first optical member and the second optical member are joined by the joining layer.

The invention makes it possible to realize an optical element with excellent joining strength and endurance due to chemical bonding by oxygen atoms.

Further, features of the invention will become apparent from the following description of exemplary embodiments (with reference to the attached drawings).

BRIEF DESCRIPTION OF THE DRAWINGS

FIGS. 7A(1), 7A(2), 7A'(1), 7A'(2) and 7B to 7D are process cross-sectional views illustrating a method for producing an optical element in accordance with the invention in Example 5 of the invention.

DETAILED DESCRIPTION OF THE PREFERRED EMBODIMENTS

A method for producing an optical element configured by joining at least a first optical member and a second optical member in an embodiment of the invention will be explained below. The optical element in accordance with the invention has a first structural part on at least one of the first optical member and second optical member, the first structural part being constituted by an oxide material and composed of a refractive index periodic structural part that is a repetition structure of spaces and structural parts having a pitch equal to or less than a wavelength of visible light.

An embodiment of the method for producing the optical element in accordance with the invention will be described below with reference to FIG. 1.

Figure 1A:
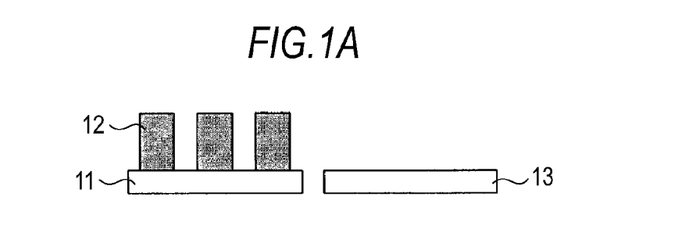
FIGS. 1A to 1D are process cross-sectional views illustrating a method for producing an optical element in accordance with the invention.

In FIG. 1A, the first optical member is configured by providing a first structural part 12 on a substrate 11, the first structural part being constituted by an oxide material and composed of a refractive index periodic structural part that is a repetition structure of spaces and structural parts having a pitch equal to or less than a wavelength of visible light. The first structural part 12 is constituted by an oxide material. The repetition structure of spaces and structural parts having a pitch equal to or less than a wavelength of visible light will be referred to hereinbelow as a refractive index periodic structural part.

The second optical member is also constituted by an oxide material. In the present embodiment, an example is considered in which the second optical member is the optical glass substrate 13, but it is also possible that a refractive index periodic structural part that is composed of an oxide material be provided on the optical glass substrate.

The optical element is produced by joining the first optical member and the second optical member. The respective optical members are joined by a joining layer composed of an oxygen-deficient oxide. As a result, an optical element having a three-dimensional structural part is formed. In accordance with the present invention, the oxygen-deficient oxide means an oxide with an amount of oxygen less than a stoichiometric amount. For example, the oxygen-deficient oxide is preferably an oxide with an amount of oxygen that is equal to or higher than 65% and equal to or less than 95% the stoichiometric oxygen amount in the oxide constituting the first optical member and second optical member. Where the oxygen amount is less than 65%, an optical element with satisfactory optical characteristics sometimes cannot be obtained, and where the oxygen amount is above 95%, a sufficient joining strength sometimes cannot be obtained.

Process of Forming the Joining Layer

Figure 1B:
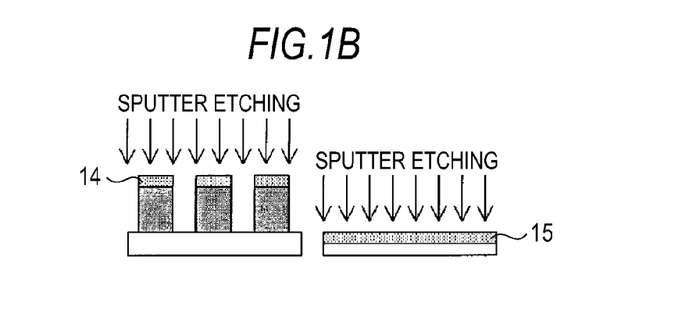

The joining layer composed of the oxygen-deficient oxide can be formed by the following method. In the first method, as shown in FIG. 1B, the first optical member and the second optical member are sputter etched by an inert gas such as Ar ions, He ions, and Kr ions. Among the oxides constituting the first optical member and second optical member, the sputter etched part is the oxygen-deficient oxide. As a result, the joining layers 14 and 15 composed of the oxygen-deficient oxide are formed.

With the second method, the joining layer is formed by sputtering. The first optical member and second optical member are formed by sputtering. In this case, the oxygen-deficient oxide is formed by setting the film formation conditions so as to obtain the oxygen-deficient oxide. As a result, joining layers composed of the oxygen-deficient oxide are formed on the first optical member and second optical member.

Process of Tightly Joining the Joining Layers

Figure 1C:
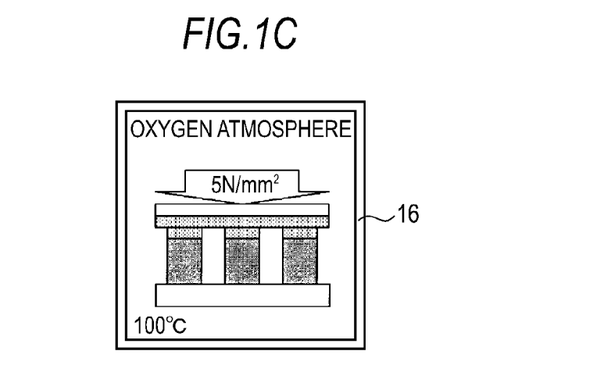

Joining of the first optical member and the second optical member is then performed, as shown in FIG. 1C. The first optical member and second optical member are brought into intimate contact and joined with the joining layers formed thereon and composed of the oxygen-deficient oxide under an ambient atmosphere comprising at least oxygen, for example, by applying a force of about 5 N/mm$^2$. For example, an ambient atmosphere comprising at least oxygen is created inside the chamber 16, and the first optical member and second optical member are tightly joined inside the chamber. In this case, the joining strength can be further increased by performing heating at a temperature of equal to or higher than 100° C.

Because joining is thus conducted with the joining layer composed of an oxygen-deficient oxide, there are many dangling bonds in the atoms at the tight joining interface and the joining strength can be increased.

Process of Oxidizing the Joining Layer

Figure 1D:
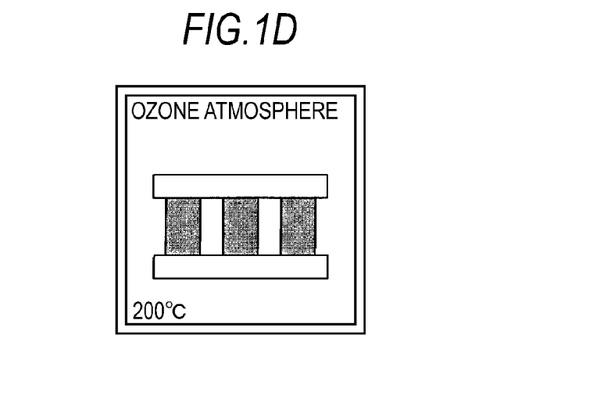

Furthermore, as shown in FIG. 1D, after tight joining has been completed, the joining layer is oxidized. In this case, plasma oxidation, thermal oxidation, or ozone oxidation can be selected for use as a means for oxidizing the joining layer. A more complete oxidation action can be produced by conducting heating at a temperature of equal to or higher than 200° C. As a result, chemical bonding by oxygen atoms can be performed and the joining strength can be further increased. Furthermore, because the variations in shape of the joining layer in the oxidation process are small, deterioration of optical characteristics caused by variations in shape can be inhibited. In addition, the absorption of light by the oxygen-deficient joining layer can be reduced, thereby making it possible to decrease the deterioration of optical characteristics.

With the above-described production method, an optical element can be obtained that is configured by joining at least the first optical member and second optical member and excels in endurance and optical performance. The obtained optical element has a refractive index periodic structural part with a period equal to or less than a wavelength of visible light on at least one of the first optical member and the second optical member formed from an oxide. Furthermore, the first optical member and second optical member, in the portions where the first optical member and second optical member are joined, have a joining layer composed of an oxygen-deficient oxide. From the standpoint of optical characteristics, it is preferred that the oxygen-deficient oxide be composed of constituent elements identical to those of the oxide material constituting the first optical member and second optical member. The first optical member and second optical member are joined by this joining layer. In addition to the line-and-space structural part, either of a hole pattern structural part and a dot pattern structural part can be used for the refractive index periodic structural part. Moreover, the refractive index periodic structural part can be constituted by any oxide material from among titanium oxide, silicon oxide, niobium oxide, zirconium oxide, hafnium oxide, and aluminum oxide. Portions of the first optical member and second optical member, other than the refractive index periodic structural part, may be constituted by an oxide material such as a glass material including any of borates, silicates, and lanthanum.

EXAMPLES

The invention will be explained below in greater detail based on examples thereof. However, the invention is not limited to these examples.

Example 1

A method for manufacturing an optical element in the present example will be described using FIG. 1 explained in the description of embodiments.

An optical glass that included silica ($SiO_2$) was used for substrates 11 and 13. In this example, a line-and-space structural part composed of titanium oxide ($TiO_2$) was formed as a first structural part 12.

As shown in FIG. 1A, a first optical member in which the line-and-space structural part 12 composed of $TiO_2$ was provided on the optical glass substrate 11 and a second optical member composed of the optical glass substrate 13 were prepared. The line-and-space structural part 12 composed of $TiO_2$ was produced by forming a $TiO_2$ film by sputtering, then patterning a photoresist layer by the usual exposure-development process, then etching space portions of the $TiO_2$ film by a dry etching method, and removing the remaining resist with an appropriate solvent. The line-and-space structural part 12 of the present example was formed to have the following dimensions: line width 30 nm, space width 110 nm, and line height 300 nm.

Further, as shown in FIG. 1B, the upper surface of the line portions of the line-and-space structural part 12 and the joining surface of the optical glass substrate 13 were sputter etched by Ar ions. As a result, a joining layer 14 composed of an oxygen-deficient oxide constituted by $TiO_x$ ($1.3 \leq x \leq 1.9$), that is, of the same constituent elements as $TiO_2$ that is the oxide material constituting the line-and-space structure was formed on the line-and-space structural part 12 composed of $TiO_2$. Furthermore, a joining layer 15 composed of an oxygen-deficient oxide constituted by $SiO_x$ ($1.3 \leq x \leq 1.9$), that is, of the same constituent elements as $SiO_2$ that was the oxide material contained in the optical glass substrate was formed on the surface of the optical glass substrate 13.

Figure 2:
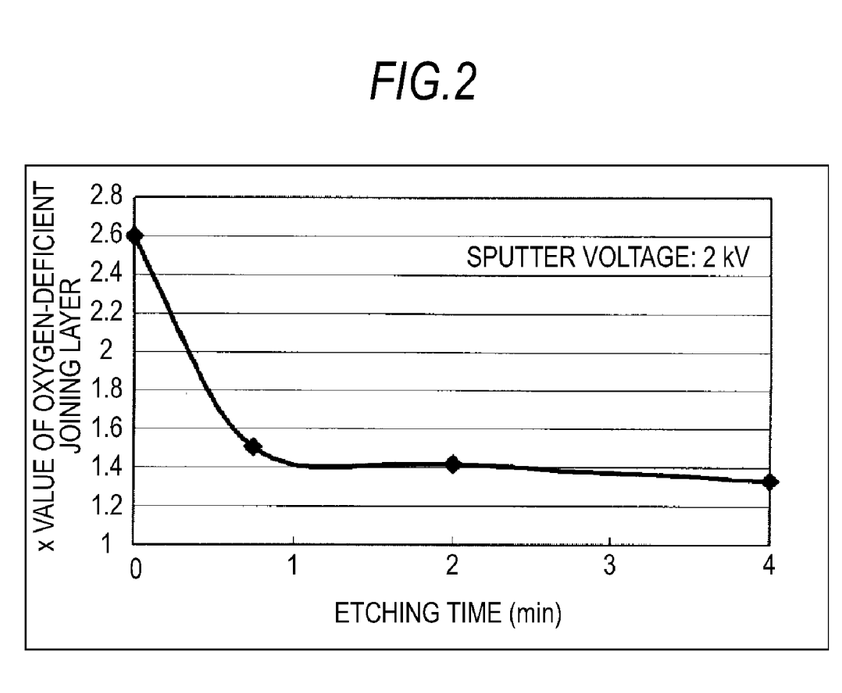
FIG. 2 illustrates the relationship between the x value of the oxygen-deficient joining layer and the Ar sputtering time.

In the present example, the sputtering conditions were set so as to obtain an x value of 1.4 in both cases. Shown in FIG. 2 is the relationship between the x value of the oxygen-deficient joining layer and Ar sputtering time in an oxide material that has been obtained as a result of comprehensive research. The x value is higher than 2 that is a stoichiometric value before the sputtering (sputtering time is 0 min) because of oxygen contained in surface contaminants.

As follows from FIG. 2, the oxygen-deficient layer can be formed by sputtering the $TiO_2$ surface with Ar ions. Likewise, the oxygen-deficient layer can be formed by sputtering the film surface including $SiO_2$ with Ar ions.

Then, as shown in FIG. 1C, when the line-and-space structural part 12 and the optical glass substrate 13 were joined, the tight joining process was implemented in the following manner. Thus, the line-and-space structural part 12 and the optical glass substrate 13 were tightly joined under an oxygen atmosphere in a chamber 16 by the joining layer 14 and joining layer 15 formed thereon. In this case, a higher joining strength could be obtained by applying pressure and heating during the tight joining process. In the present example, a pressure of 5 N/mm$^2$ was applied and heating at a temperature of 100° C. was conducted.

Figure 3:
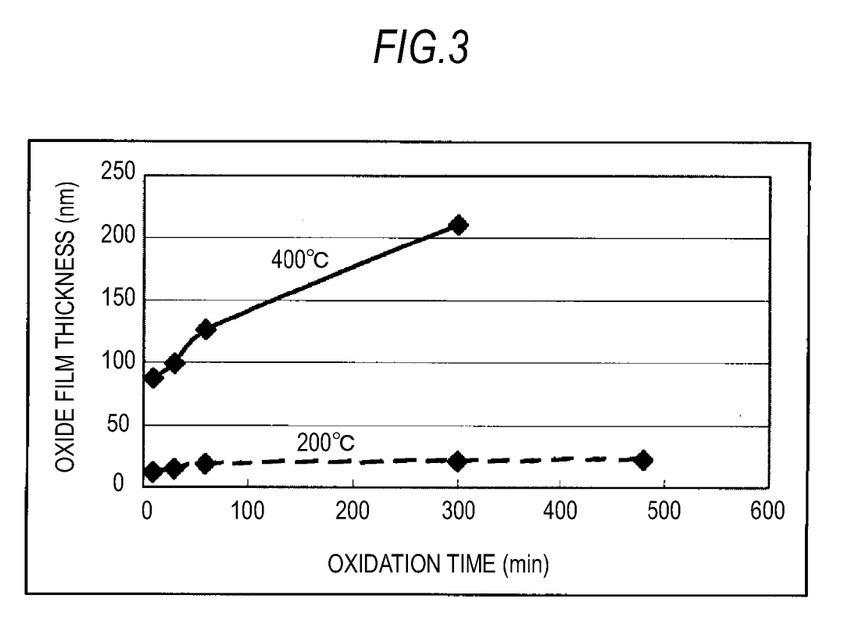
FIG. 3 illustrates the relationship between the oxide film thickness and oxidation time during ozone oxidation.

Then, as shown in FIG. 1D, oxidation was performed for 30 min at a temperature of 200° C. under an ozone atmosphere. The relationship between the oxide film thickness and oxidation time in an oxide material that has been obtained based on the results of a comprehensive research is shown in FIG. 3. As follows from FIG. 3, an oxide film with a thickness of about 15 nm could be obtained by ozone oxidation for 30 min at a temperature of 200° C. In the present example, the oxidation was carried out from both side walls due to the line-and-space structure. As a result, the entire line of 30 nm was oxidized by 15 nm oxidation from both sides. With the oxidation process, even stronger joining could be realized and the desired optical characteristics could be obtained. Evaluation of a polarizing plate formed in the above-described example demonstrated that an element with good endurance and optical characteristics was obtained.

Example 2

In Example 2, configuration examples of an optical element including a three-dimensional structural part that is different in form from that of Example 1, and a method for producing the optical element will be explained.

FIG. 4 shows a process cross-sectional diagram illustrating a method for producing an optical element including a three-dimensional structural part of the present example. In FIG. 4, the reference numerals 41 and 44 stand for optical glass substrates including silica ($SiO_2$), 42—a silicon oxide film ($SiO_2$ film), 46—a line-and-space structure composed of $SiO_2$. The reference numerals 45 and 47 stand for joining layers composed of oxygen-deficient oxides including $SiO_x$ ($1.3 \leq x \leq 1.9$). The reference numeral 48 stands for a chamber, and 49—an oxygen-deficient region.

Figure 4A:
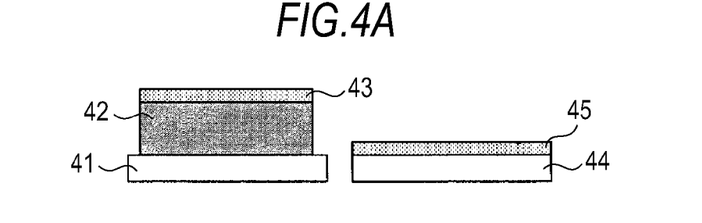
FIGS. 4A to 4D are process cross-sectional views illustrating a method for producing an optical element in accordance with the invention in Example 2 of the invention.

First, as shown in FIG. 4A, the $SiO_2$ film 42 and the joining layer 43 composed of an oxygen-deficient oxide constituted by $SiO_x$ ($1.3 \leq x \leq 1.9$), that is, of the same constituent elements as the $SiO_2$ were successively formed by sputtering on the optical glass substrate 41. Furthermore, the joining layer 45 composed of an oxygen-deficient oxide constituted by $SiO_x$ ($1.3 \leq x \leq 1.9$), that is, of the same constituent elements as $SiO_2$ that was an oxide material contained in the optical glass substrate was formed by sputtering on the optical glass substrate 44. In the present example, the film formation conditions were set so as to obtain an x value of 1.3 in both cases.

Figure 4B:
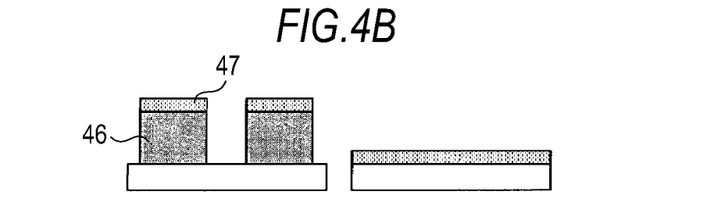

Then, as shown in FIG. 4B, the $SiO_2$ film 42 and joining layer 43 composed of an oxygen-deficient oxide, which are located on the optical glass substrate 41, are formed into line-and-space structural parts 46 and 47. The line-and-space structural parts 46 and 47 are formed by patterning a photoresist layer by the usual exposure-development process, then etching the spaces of the joining layer 43 composed of the oxygen-deficient oxide and the $SiO_2$ film 42 by a dry etching method, and then removing the remaining resist with an appropriate solvent. The line-and-space structural parts 46 and 47 of the present example were formed to have the following dimensions: line width 300 nm, space width 50 nm, and line height 300 nm.

Figure 4C:
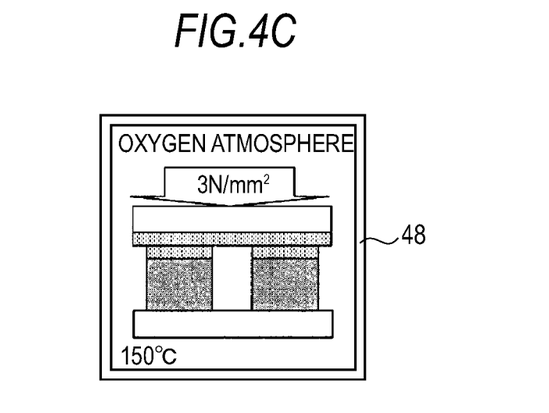

Further, as shown in FIG. 4C, when the line-and-space structural part 46 and the optical glass substrate 44 were joined, the tight joining process was implemented in the following manner. Thus, the line-and-space structural part 46 and the optical glass substrate 44 were tightly joined under an oxygen atmosphere in a chamber 48 by the joining layer 47 and joining layer 45 formed thereon. In this case, a higher joining strength could be obtained by applying pressure and heating during the tight joining process. In the present example, a pressure of 3 N/mm$^2$ was applied and heating at a temperature of 150° C. was conducted.

Figure 4D:
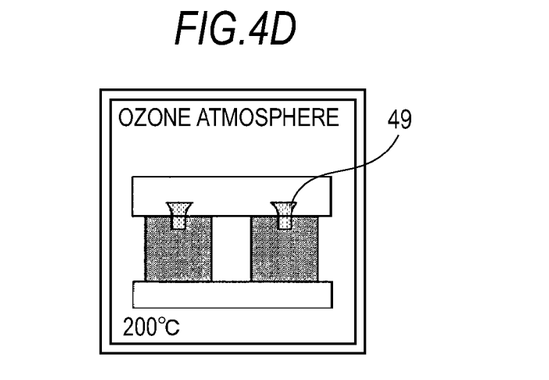

Then, as shown in FIG. 4D, oxidation was performed for 30 min at a temperature of 200° C. under an ozone atmosphere.

As follows from FIG. 3, an oxide film with a thickness of about 15 nm could be obtained by ozone oxidation for 30 min at a temperature of 200° C. In the present example, a line-and-space structural part with a line width of 300 nm was obtained. Therefore, although the oxidation was carried out from both side walls, an oxygen-deficient region 49 remained in the vicinity of joining interface, including the joining interface. Evaluation of a polarizing plate formed in the above-described example demonstrated that an element with good endurance and optical characteristics was obtained. Because the oxygen-deficient region 49 extended thinly in the line direction, no significant effect was produced on optical characteristics.

Example 3

In Example 3, configuration examples of an optical element including a three-dimensional structural part that is different in form from that of the above-described examples, and a method for producing the optical element will be explained. FIGS. 5A to 5D, 5A' and 5A" show process cross-sectional diagrams illustrating a method for producing an optical element including a three-dimensional structural part of the present example. In FIGS. 5A to 5D, 5A' and 5A", the reference numerals 51 and 53 stand for optical glass substrates including silica ($SiO_2$), and 52—a hole pattern structure composed of zirconium oxide film). The reference numeral 54 stands for a joining layer composed of an oxygen-deficient oxide constituted by $ZrO_x$ ($1.3 \leq x \leq 1.9$) and the reference numeral 55 stands for a joining layer composed of an oxygen-deficient oxide constituted by $SiO_x$ ($1.3 \leq x \leq 1.9$). The reference numeral 56 stands for a chamber, and 57—an oxygen-deficient region.

Figure 5A:
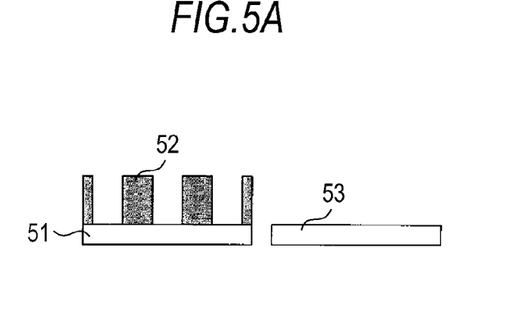
FIGS. 5A to 5D, 5A' and 5A" are process cross-sectional views illustrating a method for producing an optical element in accordance with the invention in Example 3 of the invention.

First, as shown in FIG. 5A, a hole pattern structural part 52 composed of $ZrO_2$ was prepared on the optical glass substrate 51. The optical glass substrate 53 was also prepared. FIG. 5A' shows a top view of the optical glass substrate 51 and hole pattern structural part 52 shown in FIG. 5A. FIG. 5A" is a perspective front view. FIG. 5A is an a-a sectional view of the configuration shown in FIG. 5A'. The hole pattern structural part 52 composed of $ZrO_2$ was formed by forming a $ZrO_2$ film by sputtering, then patterning a photoresist layer by the usual exposure-development process, then etching the hole portions of the $ZrO_2$ film by a dry etching method, and then removing the remaining resist with an appropriate solvent.

The hole pattern structural part 52 of the present example was formed to have the following dimensions: hole radius 50 nm, spacing 150 nm between the hole centers in the X direction and Y direction shown in FIG. 5A', and height 200 nm.

Figure 5B:
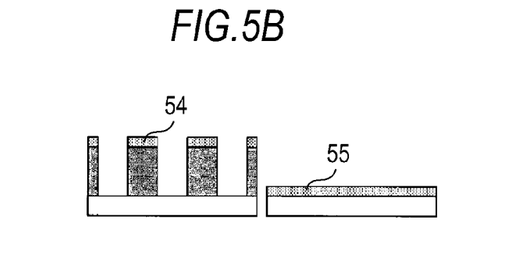

Then, as shown in FIG. 5B, a joining layer 54 composed of an oxygen-deficient oxide constituted by $ZrO_x$ ($1.3 \leq x \leq 1.9$) was formed by a sputtering method on the upper surface of convex portions of the hole pattern structural part 52. Furthermore, a joining layer 55 composed of an oxygen-deficient oxide constituted by $SiO_x$ ($1.3 \leq x \leq 1.9$), that is, of the same constituent elements as $SiO_2$ that was the oxide material contained in the optical glass substrate was formed by a sputtering method on the optical glass substrate 53. In the present example, the film formation conditions were set so as to obtain an x value of 1.3 in both cases.

Figure 5C:
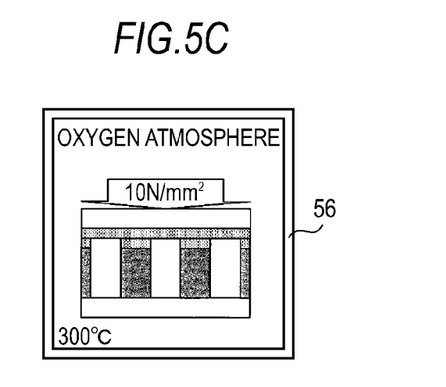

Further, as shown in FIG. 5C, when the hole pattern structural part 52 and the optical glass substrate 53 were joined, the tight joining process was implemented in the following manner. Thus, the hole pattern structural part 52 and the optical glass substrate 53 were tightly joined under an oxygen atmosphere in a chamber 56 by the joining layer 54 and joining layer 55 formed thereon. In this case, a higher joining strength could be obtained by applying pressure and heating during the tight joining process. In the present example, a pressure of 10 N/mm² was applied and heating at a temperature of 300° C. was conducted. In a case of the hole pattern structure, the hole portions are closed. Therefore, oxidation after joining is made difficult. For this reason, in the present example, oxidation was performed by thermal oxidation simultaneously with joining by raising the temperature during joining to 300° C.

Figure 5D:
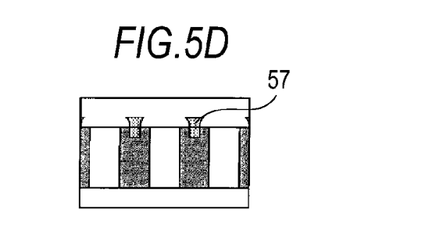

The state after joining is shown in FIG. 5D. Because oxidation during joining was insufficient, the oxidation did not reach the central portion, and an oxygen-deficient region 57 remained in the vicinity of the joining interface including the joining interface.

Evaluation of the optical element formed in the above-described example demonstrated that an element with good endurance and optical characteristics was obtained. Because the oxygen-deficient region 57 extended parallel to the light incidence direction, no significant effect was produced on optical characteristics.

Example 4

In Example 4, configuration examples of an optical element including a three-dimensional structural part that is different in form from that of the above-described examples, and a method for producing the optical element will be explained. FIGS. 6A to 6D, 6A' and 6A" show process cross-sectional diagrams illustrating a method for producing an optical element including a three-dimensional structural part of the present example.

In FIGS. 6A to 6D, 6A' and 6A", the reference numerals 61 and 63 stand for optical glass substrates including silica ($SiO_2$), and 62—a dot pattern structure composed of hafnium oxide ($HfO_2$).

The reference numeral 65 stands for a joining layer composed of an oxygen-deficient oxide constituted by $HfO_x$ ($1.3 \leq x \leq 1.9$) and the reference numeral 67 stands for a joining layer composed of an oxygen-deficient oxide constituted by $SiO_x$ ($1.3 \leq x \leq 1.9$). The reference numeral 68 stands for a chamber.

Figure 6A:
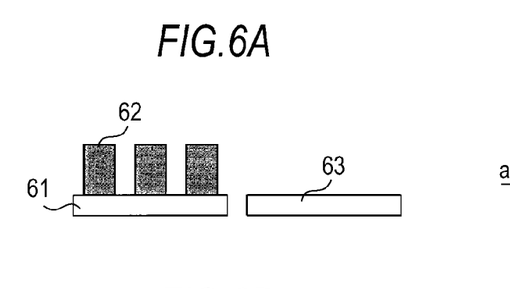
FIGS. 6A to 6D, 6A' and 6A" are process cross-sectional views illustrating a method for producing an optical element in accordance with the invention in Example 4 of the invention.

First, as shown in FIG. 6A, a dot pattern structural part 62 composed of $HfO_2$ was prepared on the optical glass substrate 61. The optical glass substrate 63 was also prepared. FIG. 6A' shows a top view of the optical glass substrate 61 and dot pattern structural part 62 shown in FIG. 6A. FIG. 6A" is a perspective front view. FIG. 6A is an a-a sectional view of the configuration shown in FIG. 6A'. The dot pattern structural part 62 composed of $HfO_2$ was formed by forming a $HfO_2$ film by sputtering, then patterning a photoresist layer by the usual exposure-development process, then etching the concave portions of the $HfO_2$ film by a dry etching method, and then removing the remaining resist with an appropriate solvent. The dot pattern structural part 62 of the present example was formed to have the following dimensions: dot radius 150 nm, spacing 400 nm between the hole centers in the X direction and Y direction shown in FIG. 6A', and height 400 nm.

Figure 6B:
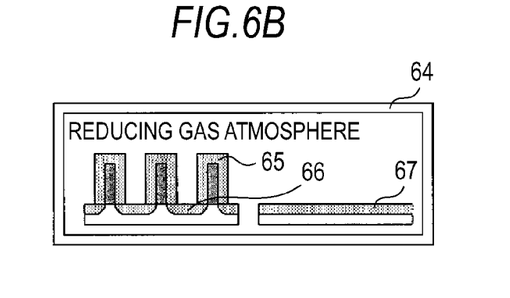

Then, as shown in FIG. 6B, the optical glass substrate 61, dot pattern structural part 62, and optical glass substrate 63 were disposed inside the chamber 64. The surface of the optical glass substrate 61, dot pattern structural part 62, and optical glass substrate 63 was then reduced by using a reducing gas such as hydrogen, carbon monoxide, or methane. A joining layer 65 composed of an oxygen-deficient oxide constituted by $HfO_x$ ($1.3 \leq x \leq 1.9$), that is, of the same constituent elements as the dot pattern structural part 62 was thus formed on the dot pattern structural part 62. Furthermore, a joining layer 67 composed of an oxygen-deficient oxide constituted by $SiO_x$ ($1.3 \leq x \leq 1.9$), that is, of the same constituent elements as $SiO_2$ that was the oxide material contained in the optical glass substrate was formed on the optical glass substrate 63. In this case, an oxygen-deficient oxide region 66 constituted by $SiO_x$ ($1.3 \leq x \leq 1.9$) was also formed on the exposed portion of the optical glass substrate 61. In the present example, the reduction conditions were set so as to obtain an x value of about 1.8.

Figure 6C:
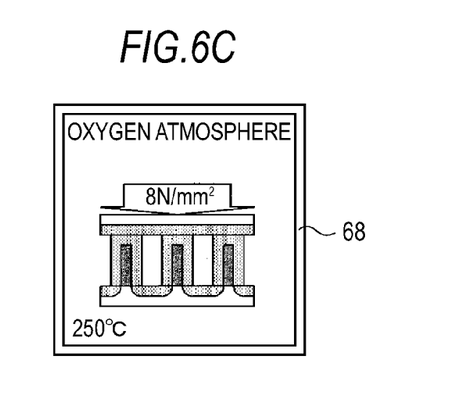

Further, as shown in FIG. 6C, when the dot pattern structural part 62 and the optical glass substrate 63 were joined, the tight joining process was implemented in the following manner. Thus, the dot pattern structural part 62 and the optical glass substrate 63 were tightly joined under an oxygen atmosphere in the chamber 68 by the joining layer 65 and joining layer 67 formed thereon. In this case, a higher joining strength could be obtained by applying pressure and heating during the tight joining process. In the present example, a pressure of 8 N/mm² was applied and heating at a temperature of 250° C. was conducted.

Figure 6D:
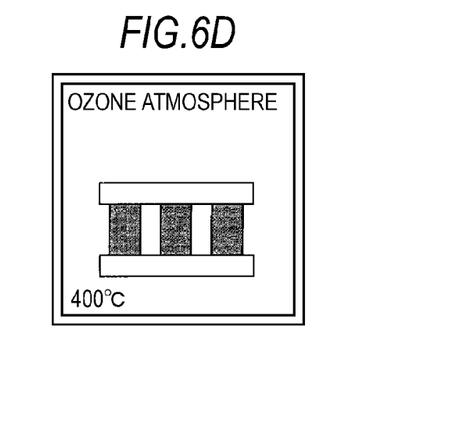

Then, as shown in FIG. 6D, oxidation was conducted for 200 min at a temperature of 400° C. in an ozone atmosphere. FIG. 3 demonstrates that an oxide film with a thickness of about 150 nm could be obtained by ozone oxidation for 200 min at a temperature of 400° C. In the present example, because of the dot pattern structural part, the oxidation was conducted from the entire side wall. For this reason, the entire dot pattern with a dot radius of 150 nm was oxidized by 150 nm oxidation from a side wall. In the present embodiment, ozone oxidation was used, but plasma oxidation may be also used. Evaluation of the optical element formed in the above-described example demonstrated that an element with good endurance and optical characteristics was obtained.

Example 5

In Example 5, configuration examples of an optical element including a three-dimensional structural part that is different in form from that of the above-described examples, and a method for producing the optical element will be explained. FIGS. 7A(1), 7A(2), 7A'(1), 7A'(2) and 7B to 7D show process cross-sectional diagrams illustrating a method for producing an optical element including a three-dimensional structural part of the present example.

Figure 7A:
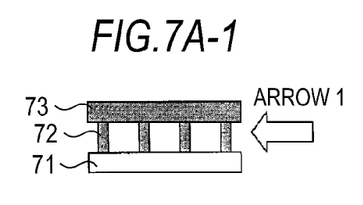
Figure 7A:
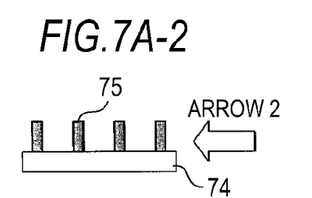
Figure 7A:
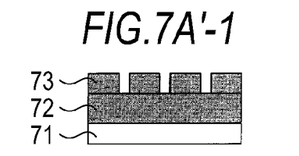

A view of the configuration shown in FIG. 7A(1) from the direction of arrow 1 is shown in FIG. 7A'(1), and a view of the configuration shown in FIG. 7A(2) from the direction of arrow 2 is shown in FIG. 7A'(2)

In FIGS. 7A(1), 7A(2), 7A'(1), 7A'(2) and 7B to 7D, the reference numerals 71 and 74 stand for optical glass substrates including silica ($SiO_2$), and 72, 73, and 75—a line-and-space structural part composed of titanium oxide ($TiO_2$). The reference numerals 76 and 77 stand for a joining layer composed of an oxygen-deficient oxide constituted by $TiO_x$ ($1.3 \leq x \leq 1.9$), and the reference numeral 78 stands for a chamber.

First, as shown in FIG. 7A(1), a substrate was prepared by laminating, with a 90° rotation of line direction, the line-and-space structural parts 72 and 73 composed of $TiO_2$ on the optical glass substrate 71. Then, as shown in FIG. 7A(2), a substrate was prepared in which the line-and-space structural part 75 composed of $TiO_2$ was provided on an optical glass substrate 74. The laminated structural part composed of line-and-space structural parts 72 and 73 composed of $TiO_2$ was planarized by filling the space portions with a resin sacrificial layer after the line-and-space structural part 72 has been formed in the same manner as in Example 1. Then, after the line-and-space structural part 73 has been formed in the same manner as in Example 1, the resin sacrificial layer was removed by ashing from the space portions of the line-and-space structural part 73. The line-and-space structural part 75 composed of $TiO_2$ was formed in the same manner as in Example 1. The line-and-space structural parts 72 and 75 of the present example were formed to have the following dimensions: line width 30 nm, space width 110 nm, and line height 300 nm. The line-and-space structural part 73 was formed to have the following dimensions: line width 110 nm, space width 30 nm, and line height 100 nm.

Figure 7B:
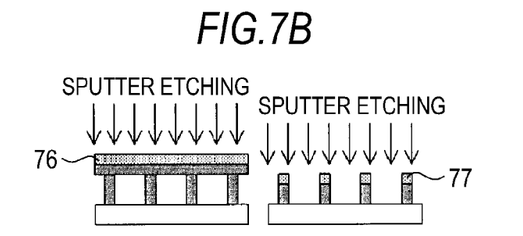

Then, as shown in FIG. 7B, the upper surface of the line portions of the line-and-space structural part 73 and the upper surface of the line portions of the line-and-space structural part 75 were sputter etched with Ar ions. As a result, joining layers 76 and 77 composed of an oxygen-deficient oxide constituted by $TiO_x$ ($1.3 \leq x \leq 1.9$), that is, of the same constituent elements as the line-and-space structural parts, were formed on the line-and-space structural parts 73 and 75 composed of $TiO_2$. In the present example, the sputtering conditions were set so as to obtain an x value of about 1.9.

Figure 7C:
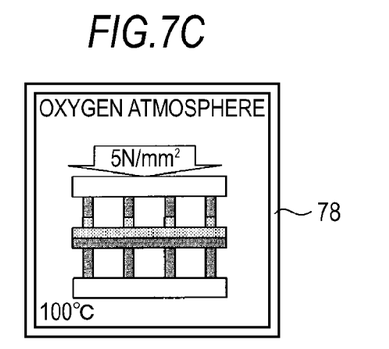

Then, as shown in FIG. 7C, when the line-and-space structural part 73 and the line-and-space structural part 75 were joined, the tight joining process was implemented in the following manner. Thus, these line-and-space structural parts were tightly joined under an oxygen atmosphere in the chamber 78 by the joining layer 76 and joining layer 77 formed thereon. In this case, a higher joining strength could be obtained by applying pressure and heating during the tight joining process. In the present example, a pressure of 5 N/mm² was applied and heating at a temperature of 100° C. was conducted.

Figure 7D:
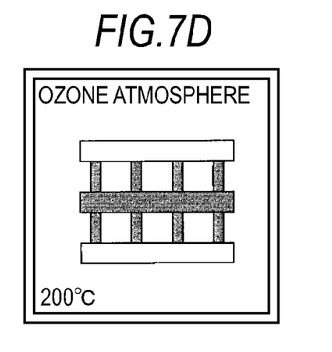

Then, as shown in FIG. 7D, oxidation was conducted for 30 min at a temperature of 200° C. in an ozone atmosphere. FIG. 3 demonstrates that an oxide film with a thickness of about 15 nm could be obtained by ozone oxidation for 30 min at a temperature of 200° C. In the present example, because of the line-and-space structural part, the oxidation was conducted from both side walls. For this reason, the entire 30 nm line was oxidized by 15 nm oxidation from each side wall. Such an oxidation process made it possible to realize even stronger joining and obtain the desired optical characteristics. Evaluation of the PBS formed in the above-described example demonstrated that an element with good endurance and optical characteristics was obtained.

Example 6

In Example 6, configuration examples of an optical element including a three-dimensional structural part that is different in form from that of the above-described examples, and a method for producing the optical element will be explained. FIGS. 8A to 8D show process cross-sectional diagrams illustrating a method for producing an optical element including a three-dimensional structural part of the present example.

In FIGS. 8A to 8D, the reference numerals 81 and 85 stand for optical glass substrates including silica ($SiO_2$), and 82, 83, and 84 a line-and-space structural part composed of titanium oxide ($TiO_2$). The reference numeral 86 stands for a joining layer composed of an oxygen-deficient oxide constituted by $TiO_x$ ($1.3 \leq x \leq 1.9$), 87 stands for a joining layer composed of an oxygen-deficient oxide constituted by $SiO_x$ ($1.3 \leq x \leq 1.9$), and the reference numeral 88 stands for a chamber.

Figure 8A:
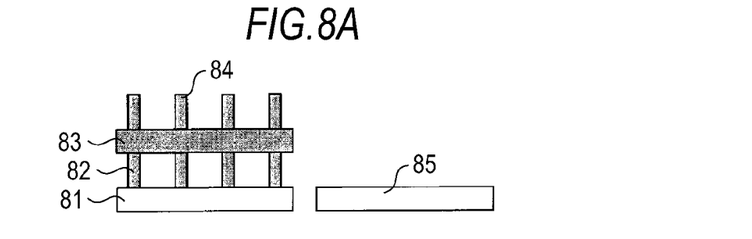
FIGS. 8A to 8D are process cross-sectional views illustrating a method for producing an optical element in accordance with the invention in Example 6 of the invention.

First, as shown in FIG. 8A, a substrate was prepared by laminating, with a 90° rotation of line direction, the line-and-space structural parts 82, 83, and 84 composed of $TiO_2$ on the optical glass substrate 81. The optical glass substrate 85 was also prepared. The laminated structural part composed of line-and-space structural parts 82, 83, and 84 composed of TiO$_2$ was planarized by filling the space portions with a resin sacrificial layer after the line-and-space structural part 82 has been formed in the same manner as in Example 1.

Then, after the line-and-space structural part 83 has been formed in the same manner as in Example 1, the sacrificial layer was removed by ashing from the space portions of the line-and-space structural part 83. Space portions in the line-and-space structural parts 82 and 83 were then filled with a sacrificial layer and planarized. The line-and-space structural part 84 was then formed in the same manner as in Example 1, and the sacrificial layer was removed by ashing from the space portions of the line-and-space structural part 84. The line-and-space structural parts 82 and 84 of the present example were formed to have the following dimensions: line width 30 nm, space width 110 nm, and line height 300 nm.

The line-and-space structural part 83 was formed to have the following dimensions: line width 110 nm, space width 30 nm, and line height 100 nm.

Figure 8B:
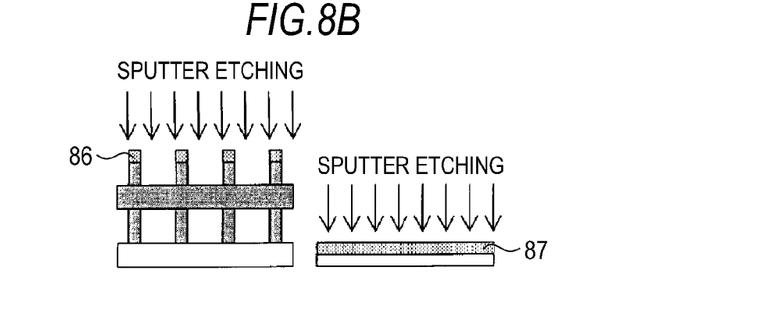

Then, as shown in FIG. 8B, the upper surface of the line portions of the line-and-space structural part 84 and the joining surface of the optical glass substrate 85 were sputter etched with Ar ions. As a result, a joining layer 86 composed of an oxygen-deficient oxide constituted by TiO$_x$ (1.3≦x≦1.9), that is, of the same constituent elements as the line-and-space structural part, was formed on the line-and-space structural part 84 composed of TiO$_2$. Then, a joining layer 87 composed of an oxygen-deficient oxide constituted by SiO$_x$ (1.3≦x≦1.9), which was an oxide material contained in the optical glass substrate, was formed on the joining surface of the optical glass substrate 85. In the present example, the sputtering conditions were set so as to obtain an x value of about 1.5 in both cases.

Figure 8C:
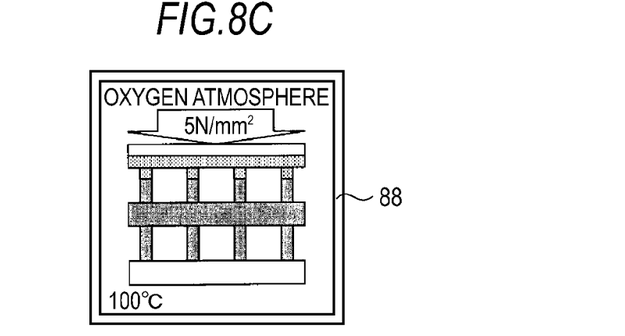

Then, as shown in FIG. 8C, when the line-and-space structural parts 82, 83, and 84 and the glass substrate 85 were joined, the tight joining process was implemented in the following manner. Thus, these line-and-space structural parts and glass substrate were tightly joined under an oxygen atmosphere in the chamber 88 by the joining layer 86 and joining layer 87 formed thereon. In this case, a higher joining strength could be obtained by applying pressure and heating during the tight joining process. In the present example, a pressure of 5 N/mm$^2$ was applied and heating at a temperature of 100° C. was conducted.

Figure 8D:
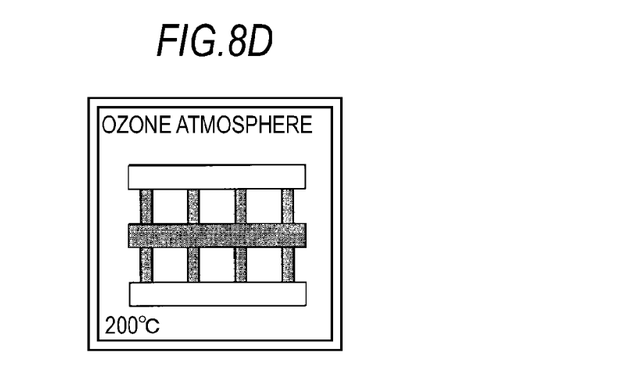

Then, as shown in FIG. 8D, oxidation was conducted for 30 min at a temperature of 200° C. in an ozone atmosphere. FIG. 3 demonstrates that an oxide film with a thickness of about 15 nm could be obtained by ozone oxidation for 30 min at a temperature of 200° C.

In the present example, because of the line-and-space structural part, the oxidation was conducted from both side walls. For this reason, the entire 30 nm line was oxidized by 15 nm oxidation from each side wall. Such an oxidation process made it possible to realize even stronger joining and obtain the desired optical characteristics. Evaluation of the PBS formed in the above-described example demonstrated that an element with good endurance and optical characteristics was obtained.

While the invention has been described with reference to exemplary embodiments, it is to be understood that the invention is not limited to the disclosed exemplary embodiments.

This application claims the benefit of Japanese Patent Application Nos. 2008-193737, filed Jul. 28, 2008, and 2009-155668, filed Jun. 30, 2009, which are hereby incorporated by reference herein in their entirety.

What is claimed is:

1. A method for producing an optical element configured by joining at least a first optical member and a second optical member formed from an oxide material, comprising:
    forming a refractive index periodic structural part with a period equal to or less than a visible light wavelength on at least one of the first optical member and the second optical member;
    forming a joining layer including an oxygen-deficient oxide on the first optical member and the second optical member;
    tightly joining the first optical member and the second optical member by the joining layer; and
    oxidizing the joining layer after the tight joining.

2. The method for producing an optical element according to claim 1, wherein the tight joining is conducted under an ambient atmosphere including at least oxygen.

3. An optical element that is configured by joining at least a first optical member and a second optical member formed from an oxide material and has a refractive index periodic structural part with a period equal to or less than a visible light wavelength, comprising:
    the first optical member and the second optical member, the refractive index periodic structural part with a period equal to or less than a visible light wavelength being formed on at least one of the optical members; and
    a joining layer including an oxygen-deficient oxide that is formed on the first optical member and the second optical member, wherein
    the first optical member and the second optical member are joined by the joining layer.

4. The optical element according to claim 3, wherein the refractive index periodic structural part is at least one structural part selected from a line-and-space structural part, a hole pattern structural part, and a dot pattern structural part.

5. The optical element according to claim 3, wherein the refractive index periodic structural part is constituted by at least one oxide material selected from the group consisting of titanium oxide, silicon oxide, niobium oxide, zirconium oxide, hafnium oxide, and aluminum oxide.

* * * * *